United States Patent
Jung et al.

(10) Patent No.: US 9,417,036 B2
(45) Date of Patent: Aug. 16, 2016

(54) OPTICAL SCOPE

(75) Inventors: In Jung, Bucheon-si (KR); Dong Hee Lee, Seongnam-si (KR)

(73) Assignee: In Jung, Bucheon-si (KR)

( * ) Notice: Subject to any disclaimer, the term of this patent is extended or adjusted under 35 U.S.C. 154(b) by 0 days.

(21) Appl. No.: 13/235,588

(22) Filed: Sep. 19, 2011

(65) Prior Publication Data

US 2012/0075696 A1   Mar. 29, 2012

(30) Foreign Application Priority Data

Sep. 29, 2010 (KR) .................. 10-2010-0094809

(51) Int. Cl.
*F41G 1/38* (2006.01)
*G02B 23/00* (2006.01)
*G02B 23/10* (2006.01)
*G02B 17/04* (2006.01)

(52) U.S. Cl.
CPC *F41G 1/38* (2013.01); *G02B 23/00* (2013.01); *G02B 23/105* (2013.01); *G02B 17/045* (2013.01)

(58) Field of Classification Search
None
See application file for complete search history.

(56) References Cited

U.S. PATENT DOCUMENTS

| 2,441,036 | A | * | 5/1948 | Schade | 359/399 |
| 2,453,336 | A | * | 11/1948 | Orser | 359/403 |
| 2,912,494 | A | * | 11/1959 | Flint | 348/343 |
| 3,384,434 | A | * | 5/1968 | Scidmore | G02B 25/001 359/644 |
| 5,130,845 | A | * | 7/1992 | Ruben | 359/428 |
| 5,532,875 | A | * | 7/1996 | Betensky | 359/399 |
| 7,869,125 | B2 | | 1/2011 | Szapiel et al. | |
| 2006/0262391 | A1 | * | 11/2006 | Thomas | F41G 1/38 359/422 |

FOREIGN PATENT DOCUMENTS

JP   2010145591 A   7/2010
WO   WO 2007140747 A1 * 12/2007

OTHER PUBLICATIONS

Fischer et al., "Optical System Design—Second Edition—Chapter 5—Review of Specific Geometrical Aberrations," 2008, pp. 80-83.

* cited by examiner

*Primary Examiner* — Stephone B Allen
*Assistant Examiner* — James McGee
(74) *Attorney, Agent, or Firm* — Baker & McKenzie LLP

(57) ABSTRACT

Disclosed is an optical scope including an objective lens, an eyepiece lens, and a reticle, wherein a field lens having negative power is disposed in at least one of a front and a back of the reticle disposed on an image formation surface of the objective lens to increase eye-relief.

7 Claims, 16 Drawing Sheets

FIG. 1
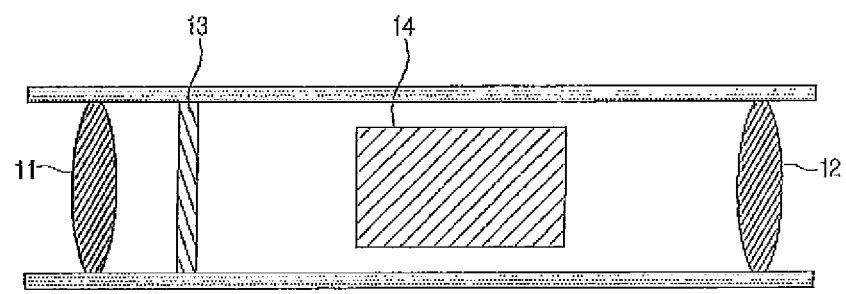
(a)
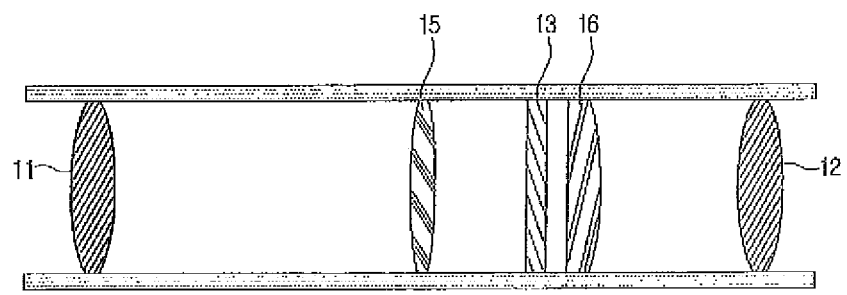
(b)
PRIOR ART

FIG. 2
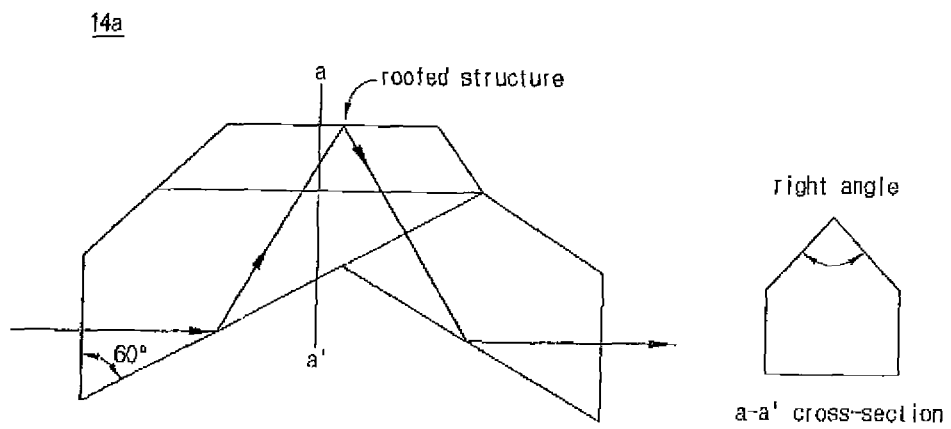
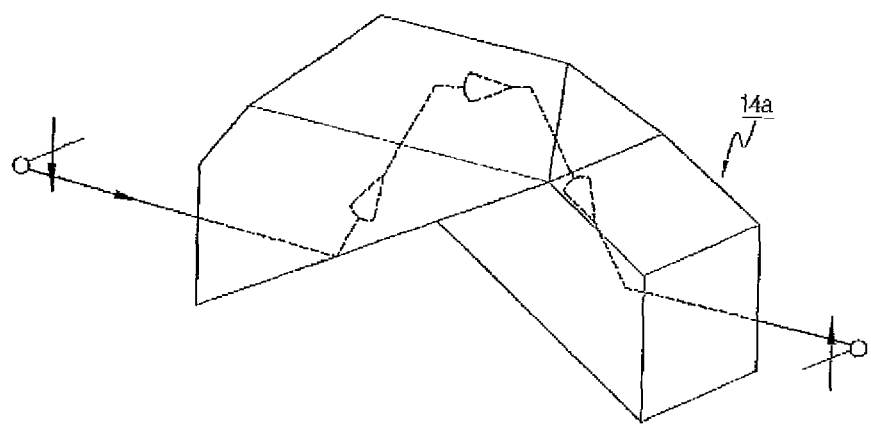
PRIOR ART

PRIOR ART

PRIOR ART

PRIOR ART

FIG. 8

| | | |
|---|---|---|
| Initial Field Lens Design | | |
| Input your Lens Data( Length of Tube, Field ang. of Obj., Mag) | | |
| Length of Tube | 144 | |
| Field ang. of Obj. | 2.5 | Wanted eye relief Length |
| Mag( minus) | 3 | 90 |
| *Click -- Calculation!* | | |
| Focal length of Field lens | -30.857 | |
| Focal length of Objective lens | 108 | |
| Focal length of Eyepiece lens | 36 | |
| Height of Field lens(Radius) | 4.712 | |
| Incident Angle of Field lens(Uf:deg./radian) | 2.5 / | 0.044 |
| Refracted Ang. of Field lens(Uf':deg./radian) | 11.25 / | 0.196 |
| Height of eyepiece lens(Radius) | 11.781 | |
| Angle of eyepiece lens(Ue':deg./radian) | -7.5 / | -0.131 |

OPTICAL SCOPE

CROSS-REFERENCE TO RELATED APPLICATION

This application claims priority to and the benefit of Korean Patent Application No. 10-2010-0094809 filed in the Korean Intellectual Property Office on Sep. 29, 2010, the entire contents of which are incorporated herein by reference.

BACKGROUND OF THE INVENTION (a) Field of the Invention

The present invention relates to an optical scope, and more particularly, to an optical scope in which a lens having negative power is disposed on an image formation surface of an objective lens, thereby increasing eye-relief.

(b) Description of the Related Art

In firearms, a sighting means may be coupled to a top portion of the firearm so as to accurately aim an external target. In a particular case of a rifle among the firearms, aiming is achieved by aligning a line of sight between a sight and a bead, in which speed showing how quickly the aiming is achieved to fire an aimed shot and accuracy showing how accurately the aimed shot hits the target are very important.

That is, an aimed-shooting method requires complicated procedures and time to acquire and ascertain a target, arrange the line of sight, aim at the target, etc. Also, because the sight and the bead themselves are very small, eyes are turned upon the sight and the bead rather than the target or a frontward situation and therefore a field of view becomes narrow if excessive attention is paid to the alignment for the line of sight in order to accurately align the sight and the bead.

Accordingly, an optical scope has been proposed to solve the above cumbersome alignment for the line of sight and improve the accuracy a little more.

The optical scope employs a magnifying-power optical system, which includes an objective lens and an objective lens reticle (i.e., the light of sight), to magnify a target, and is thus excellent in discerning the target, thereby enabling steady aiming through the reticle placed inside the scope.

Such an optical scope is broadly classified into an erecting prism type and a relay lens type. FIG. 1 shows structures of these two types.

First, referring to (a) of FIG. 1, the erecting prism type optical scope includes an objective lens 12, a prism optical system 14, a reticle 13, an eyepiece lens 11, etc. If an image of an external object from the objective lens 12 is formed at a position of the reticle 13, both the image and the reticle 13 are magnified and viewed through the eyepiece lens 11, which is the principle of a telescope or scope. At this time, if the image from the objective lens 12 is directly formed at the position of the reticle 13, the image is viewed as it is inverted. Thus, an erecting prism 14 is provided between the objective lens 12 and the reticle 13 to erect the image viewed through the eyepiece lens 11 by inverting the inverted image again. As the kind of erecting prism 14, there are an Abbe prism 14a (also called a Koenig prism or a Brashear-Hastings prism) as shown in FIG. 2, a roofed Pechan prism 14b as shown in FIG. 3, etc.

Referring to a cross-section of the erecting prism shown in FIG. 4, which is a roofed Pechan prism 14b having a face length of 17.5 mm, a roof having a right-angled prism structure is formed on a top portion of an above prism, thereby serving to invert the left and right images. A total calculated geometrical path is 77.49 mm if an air space between two prisms is 0.70 mm. The shortest distance on an optical axis of this roofed Pechan prism is 21.12 mm, and a expansion amount of the optical path length (OPL) due to the refractive index (1.5168@d-line) of the prism glass BK7 is $$(77.49 - 0.70) \times \frac{(n-1)}{n} = 26.16 \text{ mm},$$

so that the geometrical effect on reducing a body tube is 56.37 mm, and a calculated effect on reducing the optical path is 30.21 mm.

In general, the erecting prism type is advantageous to shorten the body tube, but difficult to manufacture the prism.

Meanwhile, FIG. 1 illustrates one sheet of the objective lens 12 and one sheet of the eyepiece lens 11, but many sheets of them are generally provided in practice to remove aberration or the like Referring to (b) of FIG. 1, the relay lens type optical scope includes an objective lens 12, a field lens 16, a reticle 13, a relay lens 15, an eyepiece lens 11, etc. If an image of an external object from the objective lens 12 is formed at a position of the reticle 13, both the image and the mark of the reticle 13 are formed again in front of the eyepiece lens 11 and magnified and viewed through the eyepiece lens 11, which is the principle of a relay lens type telescope. That is, if the image from the objective lens 12 is directly formed on the reticle 13, the image is generally viewed as it is inverted. This inverted image is formed once gain by the relay lens 15 and thus inverted again, so that the image in front of the eyepiece lens 11 can be erect. Then, this erect image is magnified and viewed through the eyepiece lens 11.

Generally, the optical scope includes the objective lens 12, the eyepiece lens 11, the reticle 13, and the relay lens 15 or the erecting prism 14 for erecting the image. In addition, the field lens 16 having the positive power may be interposed between the reticle 13 and the eyepiece lens 11 so as to broaden the field of view.

In designing the eyepiece lens of the scope, technology that the field of view through the eyepiece lens 11 is broadened by placing the field lens 16, which has the positive power and interposed between the reticle 13 and the eyepiece lens 11, near the reticle 13 has been applied to the scope such as the existing telescope or the like. As the field of view is broadened, eye-relief (refer to 'D' in FIG. 5) generally becomes short. Nevertheless, since there is no need for increasing the eye-relief in the existing telescope, this technology has been mostly used.

As shown in FIG. 5, it is possible to reduce more damage due to recoil of shooting in a firearm G and to quickly acquire motion of a target and its surroundings as eyes of a shooter become distant from the scope 10. However, a conventional scope 10 employs the objective lens 12, the eyepiece lens 11, the reticle 13, the relay lens 15 or the erecting prism 14 for erecting an image, and the field lens 16 having the positive power, so that a shooter's eyes gazing upon the scope 10 cannot be sufficiently distant from the scope 10.

SUMMARY OF THE INVENTION

Accordingly, the present invention is conceived to solve the forgoing problems, and an aspect of the present invention is to provide an optical scope in which a lens having negative power is disposed on an image formation surface of an objective lens in order to increase eye-relief, so that a shooter's eyes can be sufficiently distant from the scope, thereby reducing damage due to recoil of shooting in a firearm and quickly acquiring motion of a target and its surroundings.

An exemplary embodiment of the present invention provides an optical scope comprising an objective lens, an eyepiece lens, and a reticle, wherein a field lens having negative power is disposed in at least one of a front and a back of the reticle disposed on an image formation surface of the objective lens to increase eye-relief.

The objective lens, the field lens, the reticle and the eyepiece lens may be arranged in sequence.

The field lens may comprise a flat surface opposite to the eyepiece lens, and the reticle may be formed on one surface of a flat lens disposed in parallel with the flat surface of the field lens.

The field lens may include a flat surface opposite to the eyepiece lens, and the reticle may be etched on the flat surface of the field lens and formed integrally with the field lens.

The objective lens, the reticle, the field lens, and the eyepiece lens may be arranged in sequence.

The field lens may include a flat surface opposite to the objective lens, and the reticle may be formed on one surface of a flat lens disposed in parallel with the flat surface of the field lens.

The field lens may include a flat surface opposite to the objective lens, and the reticle may be etched on the flat surface of the field lens and formed integrally with the field lens.

The field lens may include a first field lens and a second field lens each having negative power, and the objective lens, the first field lens, the reticle, the second field lens, and the eyepiece lens may be arranged in sequence.

At least one of the first field lens and the second field lens may include a flat surface opposite to the reticle, and the reticle may be formed on one surface of a flat lens disposed in parallel with the flat surface of the field lens.

At least one of the first field lens and the second field lens may include a flat surface opposite to the reticle, and the reticle may be etched on a flat surface of the first field lens or second field lens and formed integrally with the first field lens or second field lens.

The optical scope may further include an erecting optical system interposed between the objective lens and the reticle and erecting an image.

The erecting optical system may include an erecting prism.

BRIEF DESCRIPTION OF THE DRAWINGS

FIGS. 1(a) and 1(b) are a structural view of a conventional optical scope according to its kinds, FIG. 2 is a structural view of an Abbe prism, FIG. 8 shows an example of a program calculation.

DETAILED DESCRIPTION OF THE EMBODIMENTS

Figure 3:
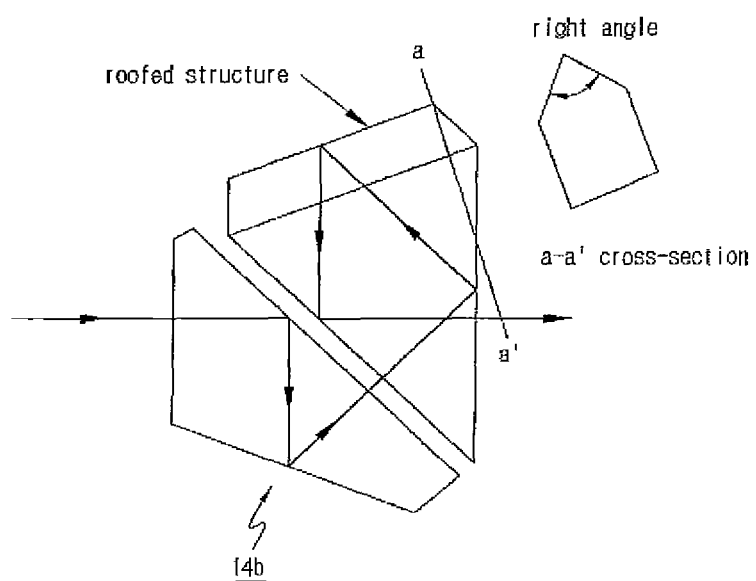
FIG. 3 is a structural view of a roofed Pechan prism.
Figure 4:
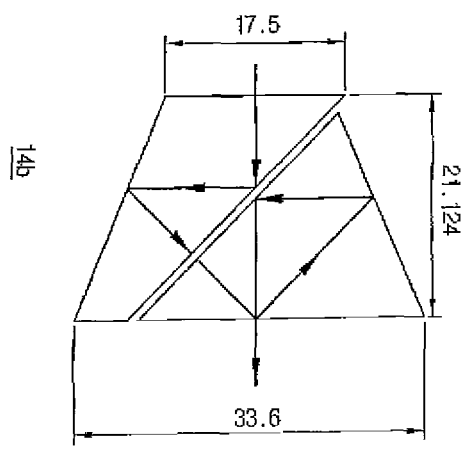
FIG. 4 is a view showing an example of a practical manufacturing size of the roofed Pechan prism.
Figure 5:
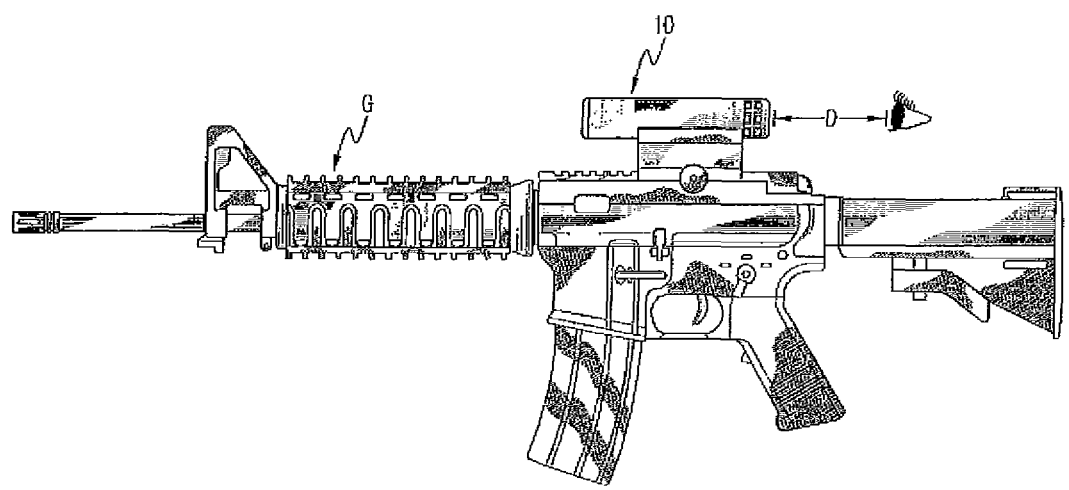
FIG. 5 is a conception view showing an eye-relief of a scope.

Prior to description, elements will be representatively explained in an embodiment and only different configurations will be described in another embodiment, in which like reference numerals refer to like elements throughout the embodiments.

Hereinafter, an optical scope according to a first exemplary embodiment of the present invention will be described with reference to the accompanying drawings.

Figure 6:
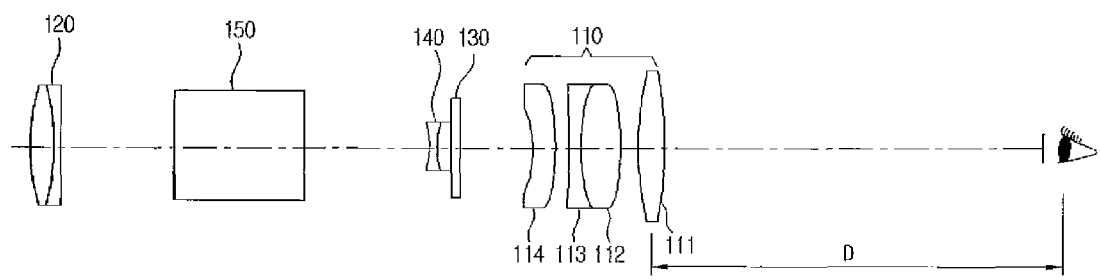
FIG. 6 is a cross-section view of an optical scope according to an exemplary embodiment of the present invention.

Among the accompanying drawings, FIG. 6 is a cross-section view of an optical scope according to an exemplary embodiment of the present invention.

As shown therein, the optical scope in this exemplary embodiment includes an eyepiece lens 110, an objective lens 120, a reticle 130, a field lens 140 having negative power, and an erecting optical system 150.

In this exemplary embodiment, the field lens 140 having negative power is disposed between the eyepiece lens 110 and the objective lens 120, so that a space between the eyepiece lens 110 and a user's eyes, i.e., eye-relief can be increased.

Before detailed descriptions about configuration of the present invention, the rationale of increasing the eye-relief is as follows.

Figure 7:
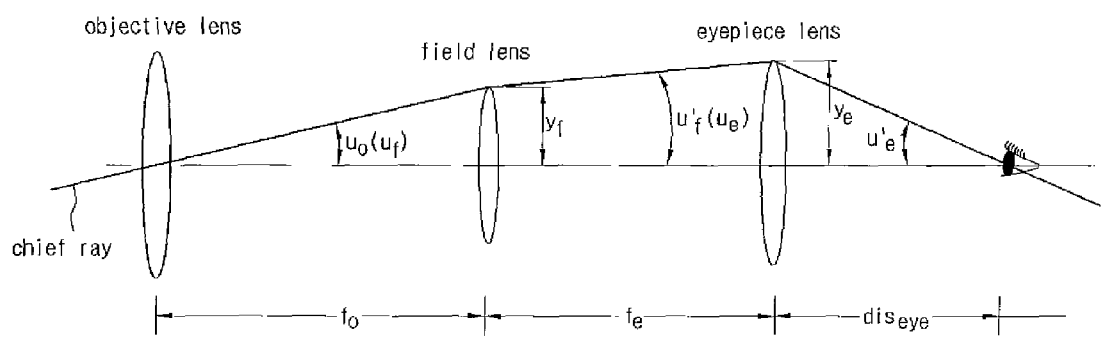
FIG. 7 is a layout showing a paraxial optical lens for calculating power of a field lens in the optical scope according to an exemplary embodiment of the present invention.

Referring to FIG. 7, let a focal distance of an objective lens be $f_o$, a focal distance of a field lens be $f_f$, a focal distance of an eyepiece lens $f_e$, eye-relief be $dis_{eye}$, an incident height of a chief ray in the field lens be $y_f$, an incident height of the chief ray in the eyepiece lens be $y_e$, a refractive angle of the chief ray passing through the objective lens be $u_o$, an incident angle and a refractive angle of the chief ray in a space before and after the field lens be $u_f$ and $u'_f$, and an incident angle and a refractive angle of the chief ray in a space before and after the eyepiece lens be $u_e$ and $u'_e$, the following equations are expanded by the length TL of the tube body, magnification mag, and paraxial ray tracing equations.

$$f_o = TL \times \frac{-mag}{1-mag} \quad \text{Equation (1)}$$

$$f_e = TL \times \frac{1}{1-mag} \quad \text{Equation (2)}$$

$$y_f = f_o \times u'_o \quad \text{Equation (3)}$$

$$u'_e = u'_o \times mag \quad \text{Equation (4)}$$

$$y_e = -dis_{eye} \times u'_e \quad \text{Equation (5)}$$

-continued $$u'_f = u'_e + y_e \times \frac{1}{f_e}$$ Equation (6)

$$f_f = \frac{y_f}{u_f - u'_f}$$ Equation (7)

In the foregoing equations (1) to (7), the length TL of the tube body and the magnification mag are determined by a user of the scope, and a view angle $u_o$ of the scope, i.e., the incident angle of the chief ray in the objective lens is determined by the diameter and length of the tube body a user wants. Thus, necessary initial design values for the field lens can be calculated in the equations (3), (6) and (7) with the tube body length TL, the magnification mag and the view angle $u_o$ of the scope which are determined initially. In accordance with practical calculation, the power (i.e., the reciprocal number of the focal distance) of the necessary field lens is changed from a positive value to a negative value as the eye-relief $dis_{eye}$ increases.

Here, it will be understood that the eye-relief can be increased by using a lens having negative power instead of a general field lens. Therefore, there is provided a rationale for replacing the field lens of the existing scope by the lens having negative power in order to increase the eye-relief.

FIG. 8 shows initial values determined by programming the above equations according to an exemplary embodiment, in which the values were determined when the tube body length TL=144 mm, the magnification mag=−3, the scope view angle $u_o$=2.5 degrees, and a desired eye-relief $dis_{eye}$=90 mm. That is, the initial values are determined under the condition that the objective lens has a focal distance $f_o$=108 mm, the field lens has a focal distance $f_f$=−30.86, the eyepiece lens has a focal distance $f_e$=36 mm, the chief ray in the field lens has an incident height $y_f$=4.71 mm, the chief ray in the eyepiece lens has an incident height $y_e$=11.78 mm, the chief ray before and after the field lens has an incident angle $u_f$=2.5 degrees and a refractive angle $u'_f$=11.25 degrees. On the basis of the obtained initial values, the objective lens and the eyepiece lens are designed together with the field lens having the negative power and combined, thereby completing the design of the scope having the eye-relief of 90 mm.

At this time, the lenses may be arranged as follows.

Figure 14:
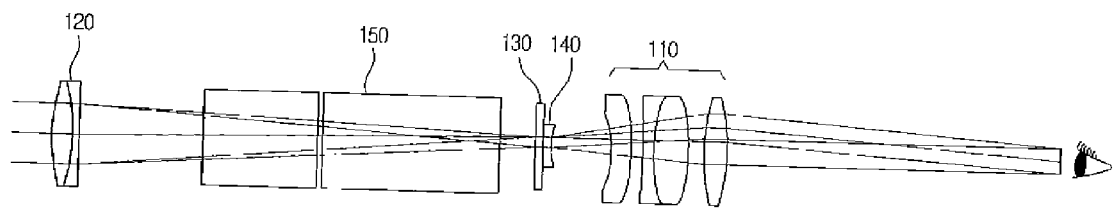
FIG. 14 is a cross-section view of an optical scope according to a second exemplary embodiment of the present invention.
Figure 15:
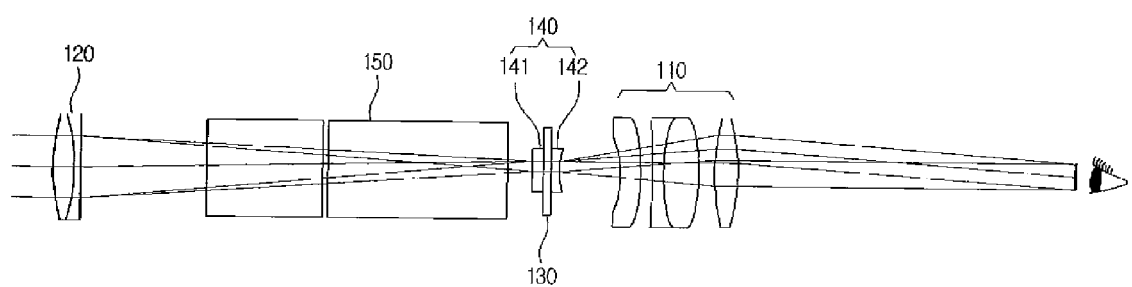
FIGS. 15 and 16 are cross-section views of an optical scope according to a third exemplary embodiment of the present invention.
Figure 16:
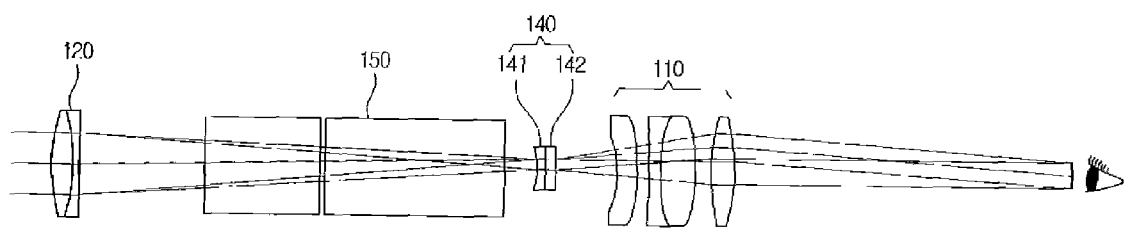

1) The object lens 120, the erecting optical system 150, the field lens 140 having the negative power, the reticle 130, and the eyepiece lens 110 are arranged in sequence (refer to FIG. 6)
2) The object lens 120, the erecting optical system 150, the reticle 130, the field lens 140 having the negative power, and the eyepiece lens 110 are arranged in sequence (refer to FIG. 14)
3) The object lens 120, the erecting optical system 150, a first field lens 141 having the negative power, the reticle 130, a second field lens 142 having the negative power, and the eyepiece lens 110 are arranged in sequence (refer to FIG. 15).

Among the foregoing various arrangements, the arrangement where the object lens 120, the erecting optical system 150, the field lens 140 having the negative power, the reticle 130, and the eyepiece lens 110 are arranged in sequence will be described below as a first exemplary embodiment.

<Design of the Eyepiece Lens Having Eye-Relief of 90 mm>

Figure 9:
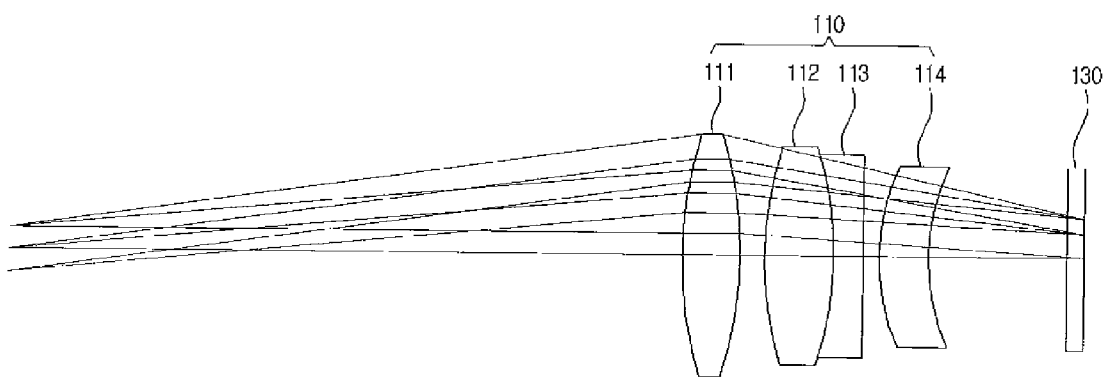
FIG. 9 is a ray tracing view of an eyepiece lens in the optical scope according to an exemplary embodiment of the present invention.

With reference to FIG. 9, the eyepiece lens 110 is configured as follows.

The specification of the eyepiece lens 110 determined by the initial values of the scope may include the focal lens $f_e$=36 mm, a distance of 90 mm from a caliber stop (a pupil of an eye) to a first lens 111, a chief ray at a view angle of 7.5 degrees (2.5 degrees×3) having an incident height of 4.71 mm and an incident angle of 11.25 degrees on the reticle, and so on. As glass for a lens used in an early design, a lens having positive power was BK7, and a lens having negative power was SF11, so that chromatic aberration in the visible region for recognition by human eyes could be controlled well. The design was performed to obtain 177.37 mm by adding a geometrical distance increasing effect of 56.37 mm in the erecting optical system 150 (i.e., an erecting prism (e.g., a roofed Pechan prism)) to a total length of 121 mm, and dividing 177.37 mm in a ratio of 3:1 to regard a length of about 44 mm as a total length of the eyepiece lens 110. That is, while using a distance 44.0 mm from the first lens 111 of the eyepiece lens 110 to the reticle 130 (having the maximum thickness of 2.0 mm) as a fixed variable, and using the distance, thickness and curvature between a second lens 112 and a fourth lens 114 arranged between the first lens 111 and the reticle 130 as variables, optimization was achieved so that a chief ray at the view angle of 7.5 degrees can have an incident height of 4.71 mm and an incident angle of 11.25 degrees on the reticle 130 with the minimum finite ray aberration. Since the reticle 130 was configured by etching on a surface facing the eyepiece lens 110 of the field lens 140, or etching a flat lens of BK7 having the maxim thickness of 2.00 mm and facing the field lens 140 and bonding it to or arranging the etched flat lens in parallel with the field lens 140, the design was achieved to make the reticle 130 have a thickness of 2.0 mm. After such primary optimization, the whole is optimized once again by using a distance from the first lens 111 of the eyepiece lens 110 to the last reticle 130 as a variable in order to control remained aberration.

It starts with three sheets of the first lens 111 having the positive power, the second lens 112 having the positive power, and the third lens 113 having the negative power, but after the optimization it was concluded with the first lens 111 having the positive power, the second lens 112 having the positive power as a doublet lens, the third lens 113 having the negative power, and a meniscus-type fourth lens 114 having weak positive power. This means that the meniscus type fourth lens 114 having the weak positive power has to be lastly added to maintain the incident angle at 11.25 degrees on the reticle 130. The chromatic aberration is sufficiently controlled by a +/−adhesion lens of the second lens 112 and the third lens 113, and the first lens 111 serves as a power lens for maintaining the focal distance $f_e$=36 mm.

Thus, design data and primary optical values of the eyepiece lens 110, which has a configuration optimized with the first lens 111 to the fourth lens 114 and eye-relief of 90 mm, were shown in [Table 1] and a ray tracing view thereof was shown in FIG. 9. Referring to this, it will be appreciated that there is a little difference at a final optimization stage, for example, the distance from the first lens 111 of the eyepiece lens 110 to the last reticle 130 is 47.60 mm (obtained by subtracting the eye-relief of 90 mm from the total length of 137.60 mm), the chief ray at the angle of 7.5 degrees has an incident height of 4.74 mm and an incident angle of 11.11 degrees on the reticle 130.

TABLE 1

[Design data and primary optical values for optimized eyepiece lens]

| EFL = 36.000 | WAVELENGTHS[nm] | | 587.60 | 656.30 | 486.10 |
|---|---|---|---|---|---|
| #SURF | RADIUS | THICK | INDEX 1 | V | CLR RAD GLASS |

TABLE 1-continued

[Design data and primary optical values for optimized eyepiece lens]

| | | | | | | |
|---|---|---|---|---|---|---|
| 1 S | Plane | 0.000 | 1.000000 | | 2.833 | |
| 2 S | 53.475 | 90.000 | 1.000000 | | 15.367 | |
| 3 S | −53.475 | 7.000 | 1.516798 | 64.14 | 15.323 | S-BK7 |
| 4 S | 35.960 | 2.500 | 1.000000 | | 13.895 | |
| 5 S | −38.019 | 9.000 | 1.516798 | 64.14 | 12.841 | S-BK7 |
| 6 S | 169.670 | 3.000 | 1.784713 | 25.75 | 11.934 | S-SF11 |
| 7 S | 26.708 | 2.000 | 1.000000 | | 11.500 | |
| 8 S | 30.861 | 6.000 | 1.516798 | 64.14 | 11.500 | S-BK7 |
| 9 S | Plane | 16.102 | 1.000000 | | 11.500 | |
| 10 S | Plane | 2.000 | 1.516798 | 64.14 | 11.500 | S-BK7 |
| 11 S | Plane | 0.000 | 1.000000 | | 11.500 | |

Infinite Conjugates
BFL 0.00005   EFL 36.00006   FNO 6.35370   FFL 53.69115
At used Conjugates(Infinite Object Distance and Finite Focus)
    MAG                    0.00000
    OBJ NA              0.00000
    IMAG NA          −0.07869
    OBJ DIST         undefined
    IMG DIST         0.00005
    TRACK            undefined
    THKNESS       137.602
    IMG HT             4.73950
    IMG ANG        −11.10865
Entrance Pupil Diameter and Distance from First Surface
    DIA    5.66600    DIST    0.00000
Exit Pupil Diameter and Distance from Last Surface <Design of the Objective Lens with Field Lens Having Negative Power>

Figure 10:
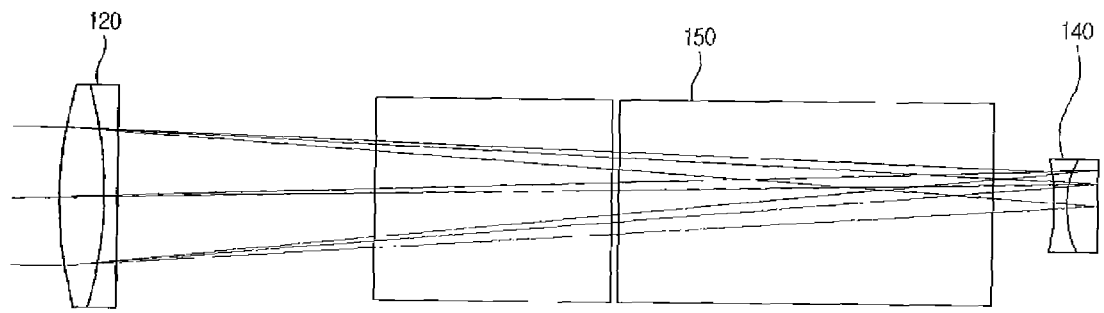
FIG. 10 is a ray tracing view of an objective lens in the optical scope according to an exemplary embodiment of the present invention.

Next, the configuration of the objective lens 120 with the field lens 140 having the negative power will be described with reference to FIG. 10.

The objective lens 120 has to have a focal distance of 108 mm, the chief ray corresponding to a view angle of 2.5 degrees on the scope has to be emergent at an angle of 11.11 on the last image formation surface so that the image can have a height of 4.74 mm, and the image formation surface of the field fens 140 has to be flat so that the reticle 130 can be etched and attached on to the image formation surface of the field lens 140 having the negative to power. In this exemplary embodiment, the objective lens 120 and the field lens 140 having the negative power were provided in the form of a doublet lens as one set of two sheets so as to reduce the chromatic aberration, and BK7 and SF2 easy to get were used as glass. The design data and the primary optical values of the objective lens 120 designed in such a manner were shown in [Table 2] and a ray tracing view thereof was shown in FIG. 10. Referring to this, it will be appreciated that the optimized objective lens 120 has an effective aperture of 17.0 mm and a total length of 129.803 mm. If it is considered that the tube body length of the erecting optical system 150 (e.g., the erecting prism) has a geometrical decreasing effect of a 56.37 mm, the total length is changed into 73,433 mm. FIG. 10 illustrates the ray tracing view in the state that an optical path of the erecting optical system 150 (e.g., the erecting prism) is spread out.

As a result of the optimization, the focal distance becomes 108 mm, but there is a little difference from an initial limit condition as the chief ray corresponding to a scope's view angle of 2.5 degrees has an emergent angle of 11.21 degrees and the image has a height of 4.72 mm. This difference is within an allowance derived when a design error is considered to allow design of the eyepiece lens 110 considering the reticle 130 having the thickness of 2.0 mm, the objective lens 120 considering the reticle 130 having the thickness of 0.0 mm configured by etching the surface of the field lens 140 facing the eyepiece lens 110 in order to accept a user's demand for forming the reticle 130 by etching the surface of the field lens 140 facing the eyepiece lens 110 or by etching the flat lens BK7 having the maximum thickness of 2.00 mm and facing the field lens 140 and bonding it to or arranging the etched flat lens in parallel with the field lens 140. Further, it will be appreciated in the optimization that such a difference brings a little difference in the path of rays entering an observer's eyes in light of combination of the objective lens 120 and the eyepiece lens 110, but has little effect on the performance of the optical system.

TABLE 2

[Design data and primary optical values for the objective lens with the field lens having optimized negative power]

| EFL = 108.002 | WAVELENGTHS[nm] | | 587.60 | 656.30 | 486.10 |
|---|---|---|---|---|---|
| #SURF | RADIUS | THICK | INDEX 1 | V | CLR RAD GLASS |
| 1 S | 62.396 | 0.000 | 1.000000 | | 8.500 |
| 2 S | −44.961 | 5.500 | 1.516798 | 64.14 | 11.500 S-BK7 |
| 3 S | −130.412 | 2.000 | 1.647686 | 33.83 | 11.500 S-SF2 |
| 4 S | Plane | 31.809 | 1.000000 | | 11.500 |
| 5 S | Plane | 29.874 | 1.516798 | 64.14 | 11.500 S-BK7 |
| 6 S | Plane | 0.700 | 1.000000 | | 11.500 |
| 7 S | Plane | 46.919 | 1.516798 | 64.14 | 11.500 S-BK7 |
| 8 S | −24.297 | 8.000 | 1.000000 | | 11.500 |
| 9 S | 12.606 | 2.000 | 1.647686 | 33.83 | 11.500 S-SF2 |
| 10 S | Plane | 3.000 | 1.516798 | 64.14 | 11.500 S-BK7 |
| 11 S | Plane | 0.001 | 1.516798 | 64.14 | 11.500 |

Infinite Conjugates
BFL 0.00068   EFL 108.002   FNO 6.35307   FFL −490.379
At used Conjugates (Infinite Object Distance and Finite Focus)
    MAG                    0.00000
    OBJ NA              0.00000
    IMAG NA          −0.07870
    OBJ DIST         undefined
    IMG DIST         0.00068
    TRACK            undefined
    THKNESS       129.803
    IMG HT             4.71547
    IMG ANG         11.21297
Entrance Pupil Diameter and Distance from First Surface
    DIA    17.00000    DIST    0.00000
Exit Pupil Diameter and Distance from Last Surface
    DIA    3.74412    DIST    −36.07950

<Combination of the Objective Lens and the Eyepiece Lens>

Figure 11:
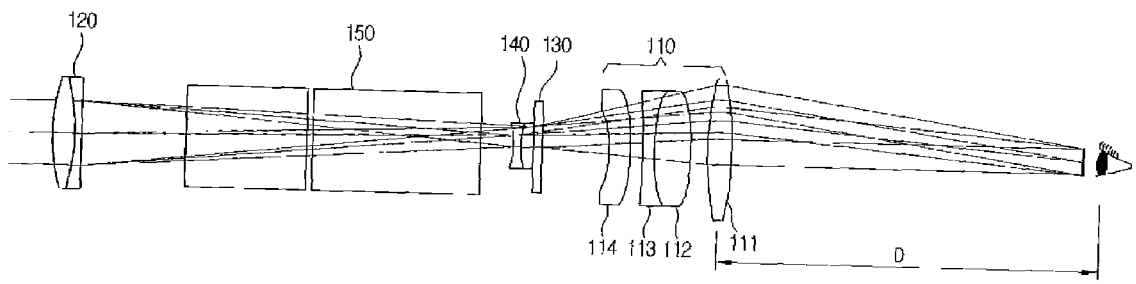
FIG. 11 is a ray tracing view of the optical scope according to an exemplary embodiment of the present invention.

As shown in FIG. 11, it is possible to configure the optical scope, the eye-relief of which is increased, by combining the objective lens and the eyepiece lens. Since the eyepiece lens 110 is designed to place the reticle 130 on the right, the eyepiece lens 110 has to combine lens data inversely when combining the objective lens 120 and the eyepiece lens 110.

Figure 12:
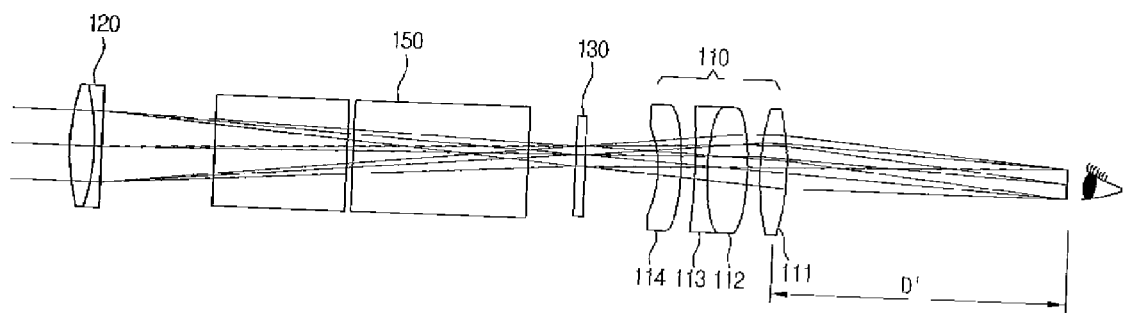
FIG. 12 is a ray tracing view of when a field lens having negative power is removed from the optical scope according to an exemplary embodiment of the present invention.

FIG. 12 shows the effect of the present invention, which illustrates that the eye-relief decreases from 90 mm to 40.6 mm when the field lens 140 having the negative power is removed.

Figure 13:
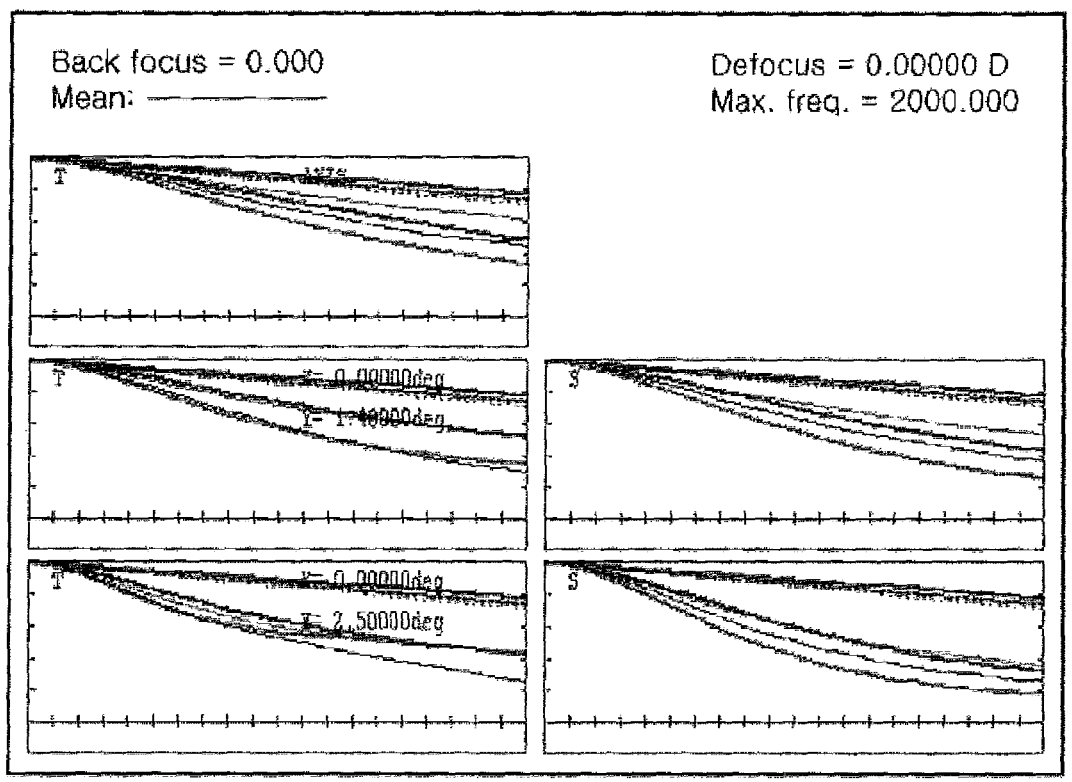
FIG. 13 is a view showing modulation transfer function (MTF) characteristics of the optical scope according to an exemplary embodiment of the present invention.

FIG. 13 shows a modulation transfer function (MTF) of an combination optical system, in which the X axis refers to a cycles/rad axis of which the maximum is 2000 cycles/rad and the Y axis refers to an MTF value of which the maximum is 1.0. That is, it will be understood that resolution is good since more than 900 cycles/rad are obtained at an MTF of 50%.

Below, an optical scope according to a second exemplary embodiment of the present invention will be described.

FIG. 14 is a cross-section view of an optical scope according to a second exemplary embodiment of the present invention. As shown therein, the optical scope according to the second exemplary embodiment is different from that of the foregoing exemplary embodiment in that an objective lens 120, an erecting optical system 150, a reticle 130, a field lens 140 having negative power, and an eyepiece lens 110 are arranged in sequence.

Here, the field lens 140 having the negative power has a flat surface opposite to the objective lens 120, so that it can be bonded to or arranged in parallel with the reticle 130 of the flat lens. With this configuration, the eye-relief is increased by the field lens 140 having the negative power like that of the foregoing exemplary embodiment, thereby having the same effect as that of the first exemplary embodiment.

Although it is not shown, the field lens 140 having the negative power may have a flat surface facing the objective lens 120, and the reticle 130 may be etched on the flat surface of the field lens 140, so that the field lens 140 and the reticle 130 can be formed as a single body, thereby omitting the flat lens.

Below, an optical scope according to a third exemplary embodiment of the present invention will be described.

FIG. 15 is a cross-section view of an optical scope according to a third exemplary embodiment of the present invention.

The optical scope according to the third exemplary embodiment is different from that of the foregoing exemplary embodiments in that a field lens 140 is divided into a first field lens 141 having negative power and a second field lens 142 having negative power, and an objective lens 120, an erecting optical system 150, the first field lens 141 having the negative power, a reticle 130, the second field lens 142 having the negative power, and an eyepiece lens 110 are arranged in sequence.

Here, the first field lens 141 and the second field lens 142 each having the negative power have flat surfaces opposite to the reticle 130, so that they can be configured as being bonded to or arranged in parallel with the reticle 130 of the flat lens.

Further, the first field lens 141 and the second field lens 142 may have flat surfaces facing the reticle 130, and the reticle 130 is etched on one of the flat surfaces of the first and second field lenses 141 and 142, so that the first field lens 141 or the second field lens 142 can be integrated with the reticle 130, thereby omitting the flat lens.

As described above, an optical scope in which a lens having negative power is disposed on an image formation surface of an objective lens in order to increase eye-relief, so that a shooter's eyes can be sufficiently distant from the scope, thereby reducing damage due to recoil of shooting in a firearm and quickly acquiring motion of a target and its surroundings.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical scope, comprising:
   an objective lens;
   an eyepiece lens;
   a reticle disposed between the objective lens and the eyepiece lens;
   an erecting optical system that erects an image and is disposed between the objective lens and the reticle; and
   a field lens having negative power disposed between the eyepiece lens and the erecting optical system, wherein
   the field lens includes a doublet having a first lens with a positive power and a second lens with a negative power,
   the first lens is closer to the reticle than the second lens,
   a straight imaginary line is defined from a center of the objective lens to a center of the eyepiece lens,
   the reticle, the erecting optical system, and the field lens are arranged such that the imaginary line intersects each of the reticle, the erecting optical system, and the field lens respectively, and
   the doublet has a flat surface and the reticle is in contact with or formed on the flat surface.

2. The optical scope according to claim 1, wherein the reticle is etched on the flat surface of the doublet of the field lens.

3. The optical scope of claim 1, wherein the first lens of the doublet includes the flat surface.

4. The optical scope according to claim 1, wherein the objective lens, the field lens, the reticle and the eyepiece lens are arranged in sequence.

5. The optical scope according to claim 4, wherein the flat surface of the doublet of the field lens is disposed opposite to the eyepiece lens.

6. The optical scope according to claim 5, wherein the reticle is etched on the flat surface of the doublet of the field lens and formed integrally with the field lens.

7. The optical scope according to claim 1, wherein the erecting optical system comprises an erecting prism.

\* \* \* \* \*